(12) United States Patent
Akamatsu et al.

(10) Patent No.: US 6,313,866 B1
(45) Date of Patent: Nov. 6, 2001

(54) THREE-DIMENSIONAL IMAGE DISPLAY APPARATUS

(75) Inventors: Naoki Akamatsu; Ritsuo Yoshida; Kazuyoshi Fuse, all of Yokohama; Hisakatsu Ito, Morioka; Toru Sugiyama, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/157,980

(22) Filed: Sep. 22, 1998

(30) Foreign Application Priority Data

Sep. 30, 1997 (JP) .................................................. 9-266604

(51) Int. Cl.$^7$ .................................................. H04N 13/04
(52) U.S. Cl. .................................................. 348/51
(58) Field of Search .................................. 348/42, 43, 46, 348/47, 51, 52, 53, 55, 59; 345/8, 425; 382/154; 351/201; 359/462

(56) References Cited

U.S. PATENT DOCUMENTS

| | | | |
|---|---|---|---|
| 3,674,921 | * | 7/1972 | Goldsmith .............................. 348/43 |
| 4,862,292 | * | 8/1989 | Enari et al. ............................. 348/42 |
| 5,260,773 | * | 11/1993 | Dischert ................................. 348/42 |
| 5,673,146 | * | 9/1997 | Kelly ................................... 348/462 |
| 5,726,704 | * | 3/1998 | Uomori ................................. 348/47 |
| 5,784,097 | * | 7/1998 | Iinuma et al. .......................... 348/43 |
| 5,808,792 | * | 9/1998 | Woodgate et al. ...................... 348/59 |
| 5,880,883 | * | 3/1999 | Sudo ..................................... 348/47 |
| 6,061,083 | * | 9/1998 | Aritake et al. ......................... 348/51 |

FOREIGN PATENT DOCUMENTS

| | | |
|---|---|---|
| 0 679 984 | 11/1995 | (EP) . |
| 0 735 784 | 10/1996 | (EP) . |
| 8-79802 | 3/1996 | (JP) . |
| 8-249493 | 9/1996 | (JP) . |

\* cited by examiner

*Primary Examiner*—Chris Kelley
*Assistant Examiner*—Gims Philippe
(74) *Attorney, Agent, or Firm*—Pillsbury Winthrop LLP

(57) ABSTRACT

A three-dimensional image display apparatus of the invention can be easily operated by the operator while a three-dimensional image created by the apparatus is observed by him. A depth information maximum value acquisition circuit acquires depth information contained in a first image signal. A parallax control circuit controls the parallax amount of a second image signal on the basis of depth information contained in the first and second image signals such that an image corresponding to the second image signal can be three-dimensionally displayed in front of an image corresponding to the first image signal. A three-dimensional image synthesizer synthesizes the first and second image signals which has been controlled by the parallax control circuit, on the basis of the parallax amount of each image signal, such that images correspond to that the first and second image signals in the three-dimensional display space.

3 Claims, 9 Drawing Sheets

FIG. 12

BEFORE OPERATION (A)

| ADDRESS | COORDINATES (X,Y,Z) | TO-BE-OPERATED ITEM |
|---|---|---|
| 0 | (4,2,2) | CHANNEL 1 |
| 1 | (3,2,2) | CHANNEL 6 |
| 2 | (2,2,2) | CHANNEL 6 |
| 3 | (1,2,2) | CHANNEL 6 |
| 4 | (0,2,2) | VOLUME ADJUSTMENT |
| 5 | (4,1,2) | CHANNEL 3 |
| 6 | (3,1,2) | CHANNEL 8 |
| 7 | (2,1,2) | CHANNEL 8 |
| 8 | (1,1,2) | CHANNEL 8 |
| 9 | (0,1,2) | COLOR ADJUSTMENT |
| 10 | (4,0,2) | CHANNEL 4 |
| 11 | (3,0,2) | CHANNEL 12 |
| 12 | (2,0,2) | CHANNEL 10 |
| 13 | (1,0,2) | SELECT UP/DOWN |
| 14 | (0,0,2) | BRIGHTNESS ADJESTMENT |
| 15 | (4,2,1) | ... |
| 23 | (1,1,1) | ... |
| 24 | (0,1,1) | CONTRAST ADJUSTMENT |
| 25 | (4,0,1) | ... |
| 38 | (1,1,0) | ... |
| 39 | (0,1,0) | UNUSED |
| 40 | (4,0,0) | ... |
| 44 | (0,0,0) | ... |

AFTER OPERATION (B)

| ADDRESS | COORDINATES (X,Y,Z) | TO-BE-OPERATED ITEM |
|---|---|---|
| 0 | (4,2,2) | CHANNEL 1 |
| 1 | (3,2,2) | CHANNEL 6 |
| 2 | (2,2,2) | CHANNEL 6 |
| 3 | (1,2,2) | CHANNEL 6 |
| 4 | (0,2,2) | VOLUME ADJUSTMENT |
| 5 | (4,1,2) | CHANNEL 3 |
| 6 | (3,1,2) | CHANNEL 8 |
| 7 | (2,1,2) | CHANNEL 8 |
| 8 | (1,1,2) | CHANNEL 8 |
| 9 | (0,1,2) | UNUSED |
| 10 | (4,0,2) | CHANNEL 4 |
| 11 | (3,0,2) | CHANNEL 12 |
| 12 | (2,0,2) | CHANNEL 10 |
| 13 | (1,0,2) | SELECT UP/DOWN |
| 14 | (0,0,2) | BRIGHTNESS ADJESTMENT |
| 15 | (4,2,1) | ... |
| 23 | (1,1,1) | ... |
| 24 | (0,1,1) | COLOR ADJUSTMENT |
| 25 | (4,0,1) | ... |
| 38 | (1,1,0) | ... |
| 39 | (0,1,0) | COLOR ADJUSTMENT |
| 40 | (4,0,0) | ... |
| 44 | (0,0,0) | ... |

Address 9: REWRITTEN INTO "UNUSED"
Address 39: PREVIOUS VALUE OF (0,1,2) IS WRITTEN

THREE-DIMENSIONAL IMAGE DISPLAY APPARATUS

BACKGROUND OF THE INVENTION

This invention relates to a three-dimensional image display apparatus applicable to, for example, a television for the purpose of providing vivid images.

In the description below, the three-dimensional image is considered the same as a stereoscopic image. A stereoscopic image display apparatus which is disclosed in, for example, Japanese Patent Application KOKAI Publication No. 8-249493 is exemplified as the prior art. In this stereoscopic image display apparatus, character information to be displayed three-dimensionally is written beforehand in a memory unit together with left-eye and right-eye positional information. When the positional information has been accessed, a character appears in any optional position in a stereoscopically displayed space, and this character shifts in left/right directions, up/down directions or forward/backward (depth) directions.

Further, in this stereoscopic image display apparatus, an image to be seen by the left eye of a viewer and an image to be seen by the right eye of a viewer are displayed on the screen in a time-division manner. At this time, shutter glasses provided for the apparatus are controlled such that its left-side shutter is open and its right-side shutter is closed while the image to be seen by the left eye is displayed on the screen. On the other hand, the right-side shutter is open and the left-side shutter is closed while the image to be seen by the right eye is displayed on the screen.

A stereoscopic image will be sensed as follows:

The image to be seen by the left eye and the image to be seen by the right eye are displayed on left and right portions of the screen, respectively. As a result, the image L1 to be directed to the left eye of a viewer and the image R1 to be directed to the right eye of the viewer have horizontal displacements. These displacements are called "binocular disparity" and cause the user to sense a three-dimensional image appearing on, in front of or behind the screen.

Since the audience has to use the shutter glasses to see an image on the above stereoscopic image display apparatus, it is easy for him to see the apparatus located ahead but difficult to see something located near him.

Accordingly, when the user switches television channels or adjusts the volume, he has to struggle with his shutter glasses on or take off the glasses, in order to find an infrared remote controller as the conventional control means.

A parallax barrier binocular type stereoscopic image display apparatus is exemplified as another type of stereoscopic display apparatus. In this apparatus, images for the left eye and ones for the right eye are arranged alternately inside the slit aperture of the apparatus, so that the left eye can see only the image for the left eye, and the right eye only the image for the right eye. As a result, the observer or user can see a stereoscopic image.

However, the movable range of the eyes in which a stereoscopic image can be seen (i.e. the movable range of the user's position) is principally narrow. In light of this, the display apparatus includes a lamp for informing the user of a position in which the user can correctly observe a stereoscopic image. Further, the apparatus also includes a sensor for sensing the present position of the user. In accordance with the sensed position of the user, the display function of the apparatus is corrected so as to enable him to see a clear stereoscopic image.

This display apparatus is also disadvantageous in that it is necessary for the user to take his eyes off the screen or struggle to find a remote controller, in order to switch channels or change the volume. In addition, since the control based on the measured position of the user starts to work normally after the user finds the remote controller and returns to the predetermined position, lots of time is required before he can observe stereoscopic images again.

As described above, the conventional three-dimensional image display apparatuses are disadvantageous in that the user has to struggle to find its remote controller in order to, for example, switch channels while watching the display apparatus.

BRIEF SUMMARY OF THE INVENTION

It is the object of the invention to provide a three-dimensional image display apparatus which the user can easily operate while observing a stereoscopic image displayed thereon.

To attain the object, the three-dimensional image display apparatus of the invention incorporates parallax control means for receiving a first image signal and a second three-dimensional image signal, and controlling the parallax amount of a second image signal so that a second image corresponding to the second three-dimensional image signal can be displayed in front of (i.e. closer to the observer) a first image corresponding to the first image signal.

The above means enables display of, for example, a stereoscopic image for operation in front, which image is used to switch the channels of a television as the display apparatus or to adjust its volume.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 12 is a view, useful in explaining a modification of associated memory contents created by a association modifying circuit 303;

DETAILED DESCRIPTION OF THE INVENTION

The embodiments of the invention will be described with reference to the accompanying drawings.

Figure 1:
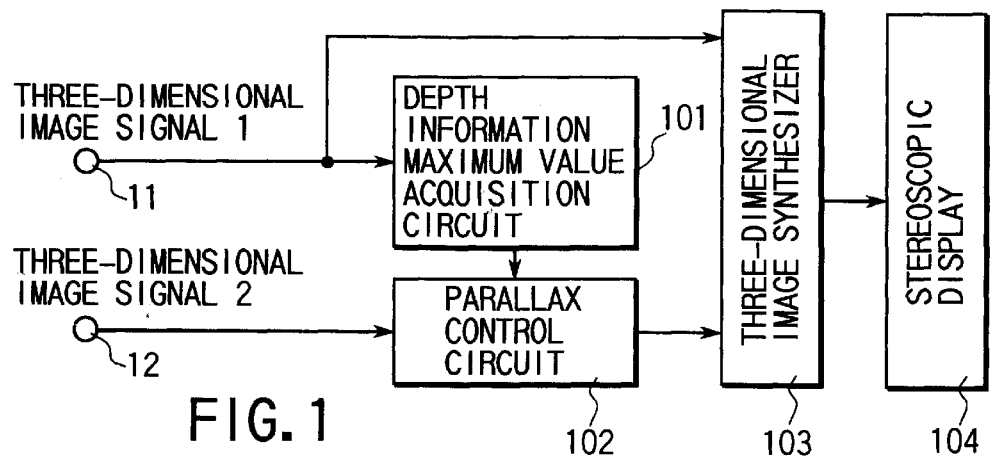
FIG. 1 is a block diagram, showing a first embodiment of the invention.

FIG. 1 shows a first embodiment of the invention.

First image signals are input to an input terminal 11, while second image signals are input to a second input terminal 12. In this embodiment, the first and second image signals are both three-dimensional image signals and each include image signal components to be seen by the left and right eyes. Each of the first and second image signals is input in a field sequence (in a non-interlace manner). The first image signal is input to a depth information maximum value acquisition circuit 101 and a three-dimensional image synthesizer 103. The second image signal is input to a parallax control circuit 102. The second image signal specifically indicates a stereoscopically displayed character, numerical value, sign, etc. such as a channel number, a program name, an operation name (volume adjustment operation, image quality adjustment, etc.), etc.

As aforementioned, the first image signals are three-dimensional image signals and each include image signal components to be seen by the left and right eyes and input in a field sequence. When the first image signal has been input to a stereoscopic display 104, a three-dimensional image is displayed. Depth information on the to-be-displayed image can be obtained by calculation based on the positions of the left and right eyes, the screen and the images to be seen by the left and right eyes. For explanation, depth information indicative of a position closer to the observer than the screen will be denoted by a positive value, while that indicative of a position remoter from the observer than the screen will be denoted by a negative value.

Figure 2:
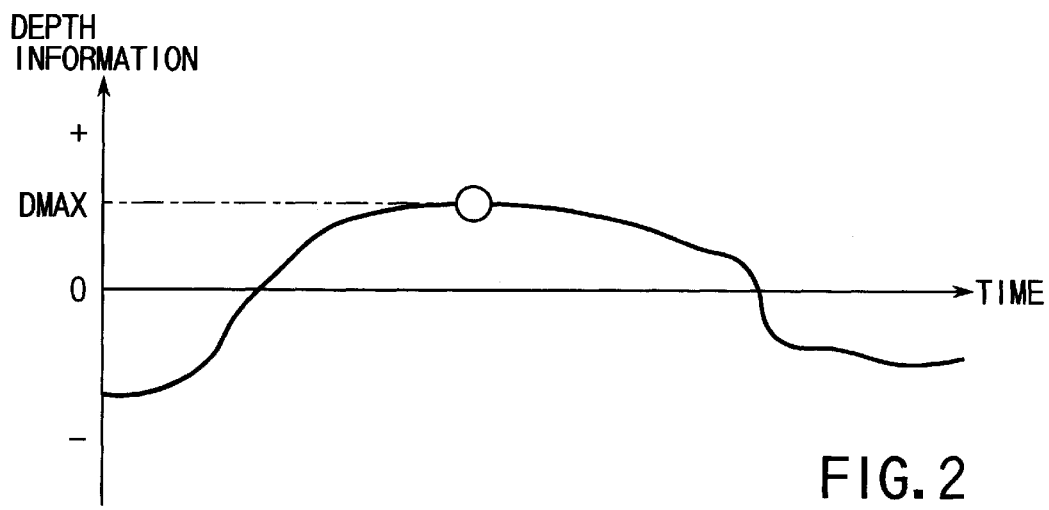
FIG. 2 is a view, useful in explaining examples of variations in information concerning the depth of an image.

Depth information on an image closest to the observer, i.e. depth information indicative of a maximum depth, will be noticed. In FIG. 2, the abscissa indicates time, and the ordinate depth information. Thus, FIG. 2 shows examples of variations in depth information with the lapse of time. In the time range shown in FIG. 2, depth information on a closest image concerns the marked image portion and indicates a maximum depth DMAX.

Thus, the depth information maximum value acquisition circuit 101 obtains a maximum depth, concerning the first image signal, in one field or up to now from a predetermined previous time point. This maximum value is input to the parallax control circuit 102.

The parallax control circuit 102 uses the input depth information maximum value (=DMAX in FIG. 2) to control depth information contained in the second image signal so that the formula (any optional depth indicated by the depth information of the second image signal)>(the maximum depth indicated by the depth information of the first image signal) will be satisfied.

Figure 3:
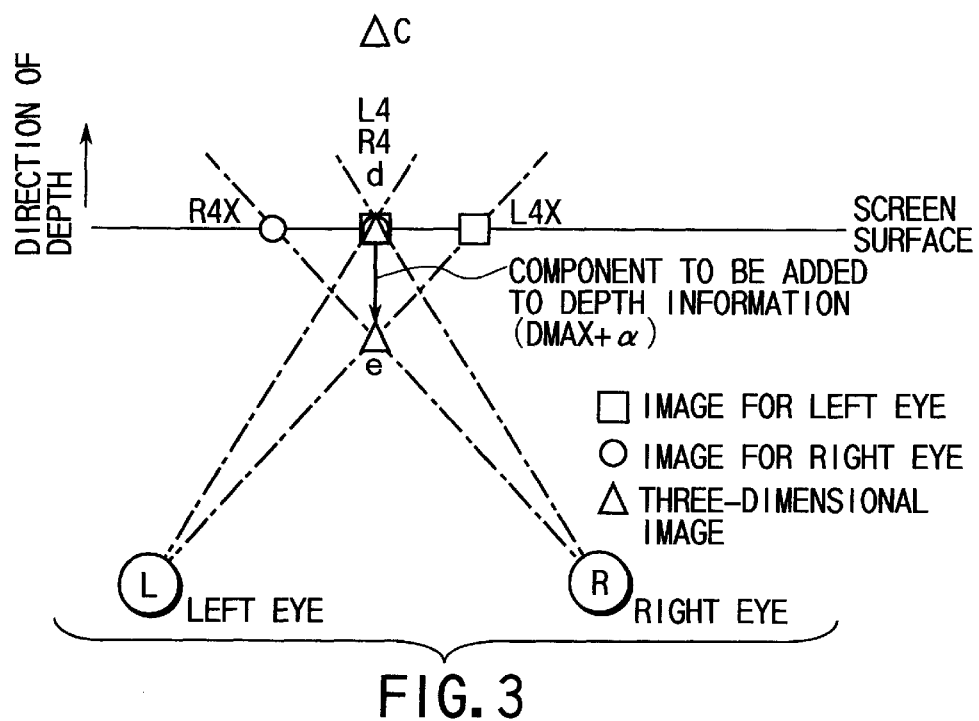
FIG. 3 is a view, useful in explaining the effect of binocular vision as a result of the operation of a parallax control circuit incorporated in the first embodiment.

Control as shown in FIG. 3 is exemplified, in which depth information maximum value DMAX contained in the first image signal and an allowance α are added to depth information on a second image d (L4, R4) corresponding to a second image signal, thereby converting the second image corresponding to the second image signal into a three-dimensional image e (L4X, R4X). The thus-controlled three-dimensional image signal is input to the other input terminal of the three-dimensional synthesizer 103. The three-dimensional image synthesizer 103 compares depth information items contained in the input two image signals, and synthesizes the signals so that the one of these signals which includes a larger depth will be output. In other words, where the display area of a second image corresponding to a second image signal is smaller than the display possible area of the display 104, and where a first image corresponding to a first image signal exists behind the non-display area of the second image, the synthesizer 103 synthesizes the first and second image signals so that the first image will be displayed in the non-display area of the second image.

The three-dimensional image synthesizer 103 can be constituted of a simple selector which, for example, outputs a three-dimensional image of a second image corresponding to a second image signal, in the display area of the second image signal, and outputs a first image corresponding to a first image signal and located behind the second image, in the non-display area of the second image signal. Even such a simple three-dimensional image synthesizer can perform excellent display, since depth information is controlled by, for example, the parallax control circuit 102 such that the second image is displayed in front of the first image in the display area of the second image.

Where the input depth information indicates that the minimum depth of the second image is smaller than the maximum depth of the first image, if the second image is displayed without any control, the second image is seen such that it is partially sunk into the first image, which will impart a strong feeling of incompatibility to the observer.

The invention can avoid the above and always display the second image in front of the first image by monitoring and controlling their depth information as described above.

Although in the embodiment, the first image signal is a three-dimensional image signal, it may be a two-dimensional image signal as in the conventional case. In this case, the same processing as above can be performed by considering that the first image signal is a three-dimensional image signal which indicates a stereoscopic image of a uniform depth.

Further, where the second image signal is generated in the three-dimensional display apparatus itself, it may preferably be set to have depth information indicative of a greater depth than the maximum depth indicated by the depth information of the first image signal.

Figure 4:
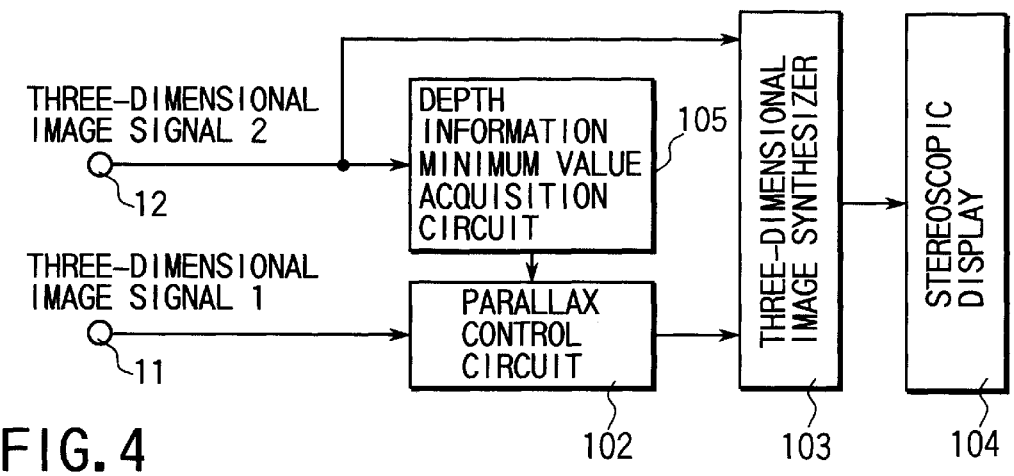
FIG. 4 is a block diagram, showing a second embodiment of the invention.

Moreover, although in the above embodiment, the depth information of the second image signal is controlled, the depth information of the first image signal may be controlled as shown in FIG. 4 so that the formula (the minimum depth indicated by the depth information of the second three-dimensional image signal)>(any optional depth indicated by the depth information of the first image signal) will be satisfied. In this case, the other structure is similar to the aforementioned embodiment.

In this embodiment, a first image signal is input to an input terminal 11, while a second image signal is input to a second input terminal 12. Then, the first image signal is fed to a parallax control circuit 106, and the second image signal to a depth information minimum value acquisition circuit 105 and also to a three-dimensional image synthesizer 103. The output terminal of the parallax control circuit 103 is connected to the three-dimensional image synthesizer 103. In this synthesizer, the depth information items of the input two image signals are compared with each other, whereby synthesization is performed such that the one of these signals which indicates a larger depth will be output.

Figure 5:
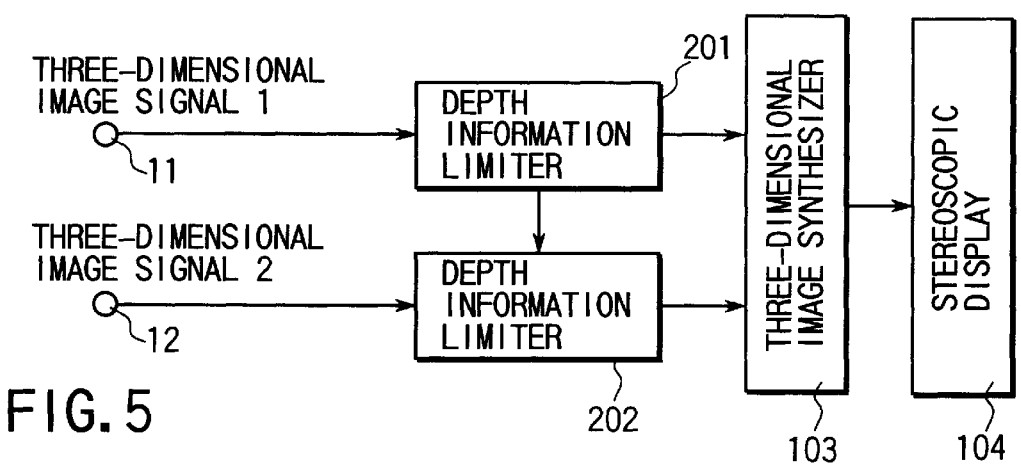
FIG. 5 is a block diagram, showing a third embodiment.

Referring then to FIG. 5, a yet further embodiment will be described.

A first image signal is input to an input terminal 11, while a second image signal is input to a second input terminal 12. Then, the first image signal is fed to a first depth information limiter 201, and the second image signal to a second depth information limiter 202. The image signals limited by the depth information limiters 201 and 202 are fed to a three-dimensional image synthesizer 103.

In general, a three-dimensional image display (indicated by 104, for example) has a range ($f \leq x \leq g$) within which the depth indicated by the depth information x of a three-dimensional image signal which can be displayed thereon falls.

Figure 6A:
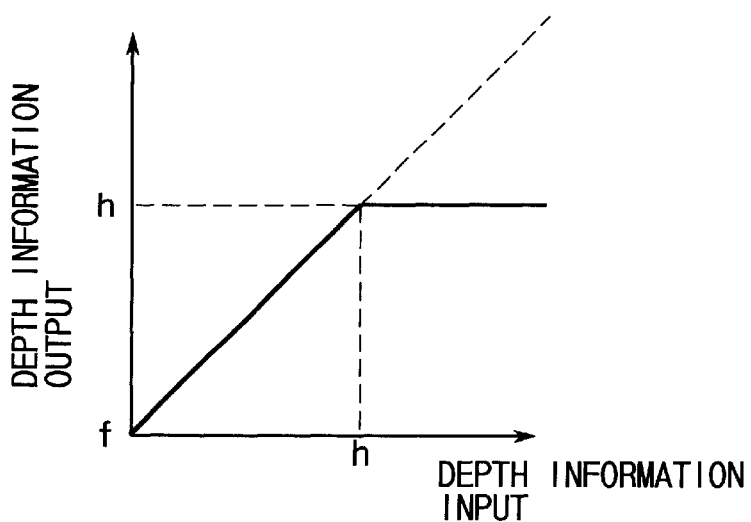
FIGS. 6A to 6C are graphs, useful in explaining examples of characteristics of a depth information limiting unit.
Figure 6B:
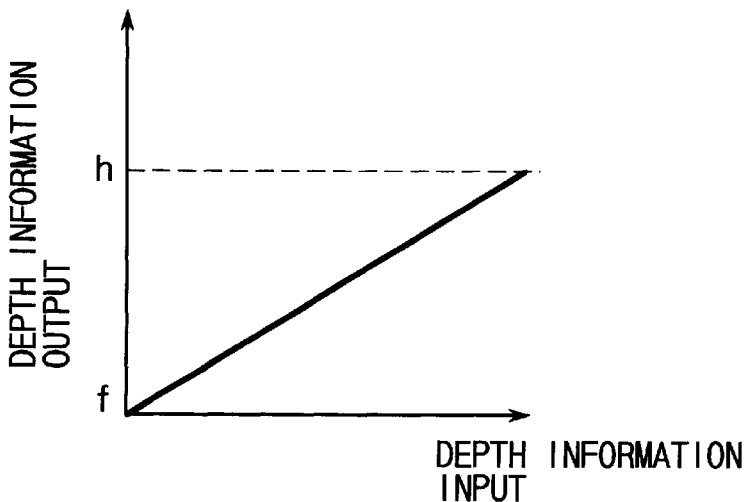
Figure 6C:
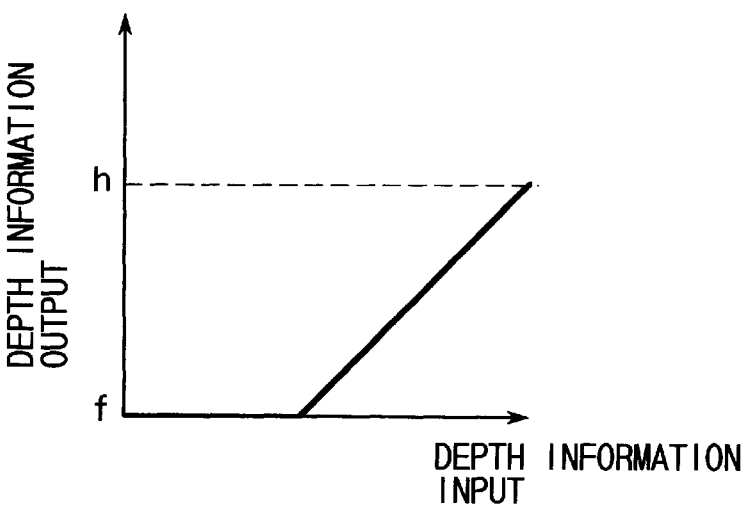

The first depth information limiter 201 limits, within a range of $f \leq x1 < h$, a depth x1 which can be indicated by the depth information of the first image signal, and outputs it to the three-dimensional synthesizer 103. FIGS. 6A to 6C show examples of characteristics of the first depth information limiter 201. FIG. 6A shows an example, in which input depth information higher than h is limited to h. FIG. 6B shows an example, in which a constant value is multiplied so that the maximum depth indicated by the depth information is set at h or less. FIG. 6C shows an example, in which the depth information is controlled so that an image with various depths will be uniformly moved behind to make its maximum depth be reduced to h or less.

The second depth information limiter 202 limits, within a range of $h \leq x2 \leq g$, a depth x2 which can be indicated by the depth information of the second image signal, and outputs it to the three-dimensional synthesizer 103. However, the second depth information limiter 202 is not necessary when the depth x2 is beforehand set at a value which falls within the range of $h \leq x2 \leq g$ by, for example, constructing the three-dimensional image display apparatus to generate the second three-dimensional image signal therein.

The first depth information limiter 201 may not always be installed in the three-dimensional image display apparatus in a narrow sense. For example, this limiter 201 may be located on a broadcasting station side from which three-dimensional image signals are transmitted. Alternatively, the first limiter 201 may be incorporated in a three-dimensional image camera for picking up three-dimensional images, thereby outputting three-dimensional image signals with limited depth information. Moreover, it may be installed in a system for reproducing record media which store broadcasted three-dimensional images or the outputs of the three-dimensional camera.

Figure 7:
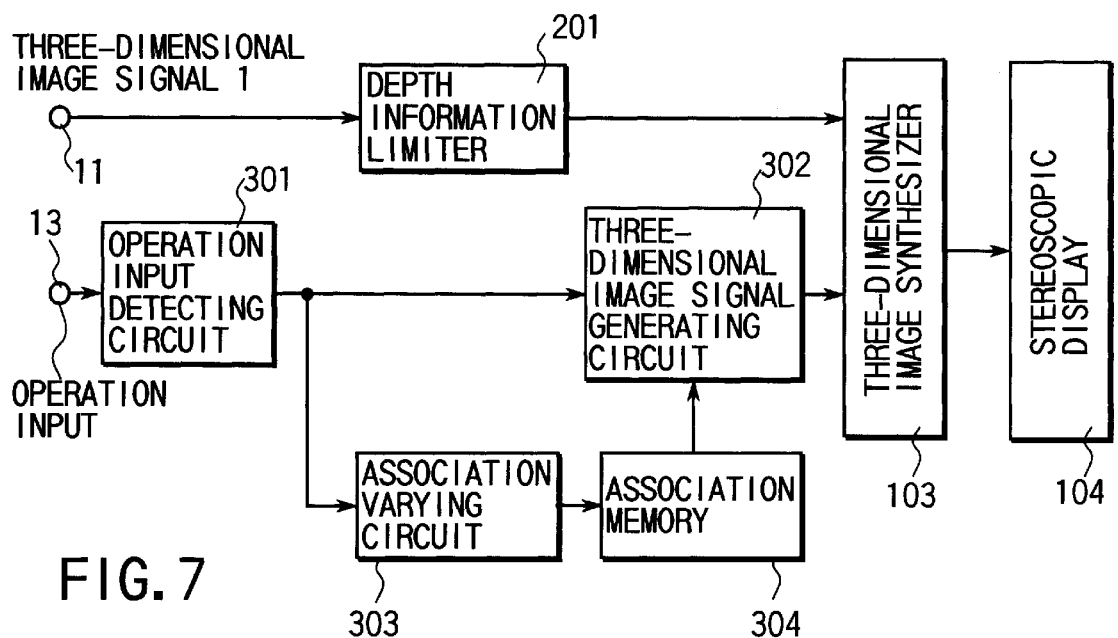
FIG. 7 is a block diagram, showing a third embodiment of the invention.

Referring to FIG. 7, another embodiment will be described.

An operation-input detecting circuit 301 detects an operation or input performed by the operator, and supplies the detection result to a three-dimensional image generating circuit 302 and an association varying circuit 303. The operation-input detecting circuit 301 also detects and outputs the positions of the left and right eyes of the operator (observer), in order to correct and control the stereoscopic display function of the apparatus using a display correcting/controlling circuit (not shown) incorporated in the display 104, so that a stereoscopic image can be seen from the position of the observer.

The three-dimensional image generating circuit 302 uses, to generate a second three-dimensional image signal, the output of an association memory 304 which stores association information to be varied in accordance with the outputs of the operation-input detecting circuit 301 and the association varying circuit 303. An image corresponding to the generated three-dimensional image signal is an image of, for example, a button or a rotary or slide switch for operating the three-dimensional image display apparatus, or a numerical value indicative of a presently received channel. As described above, the depth information of the second image signal indicates the depth of a three-dimensional image displayed in front of that indicated by the first image signal which output from the depth information limiter 201.

Figure 8:
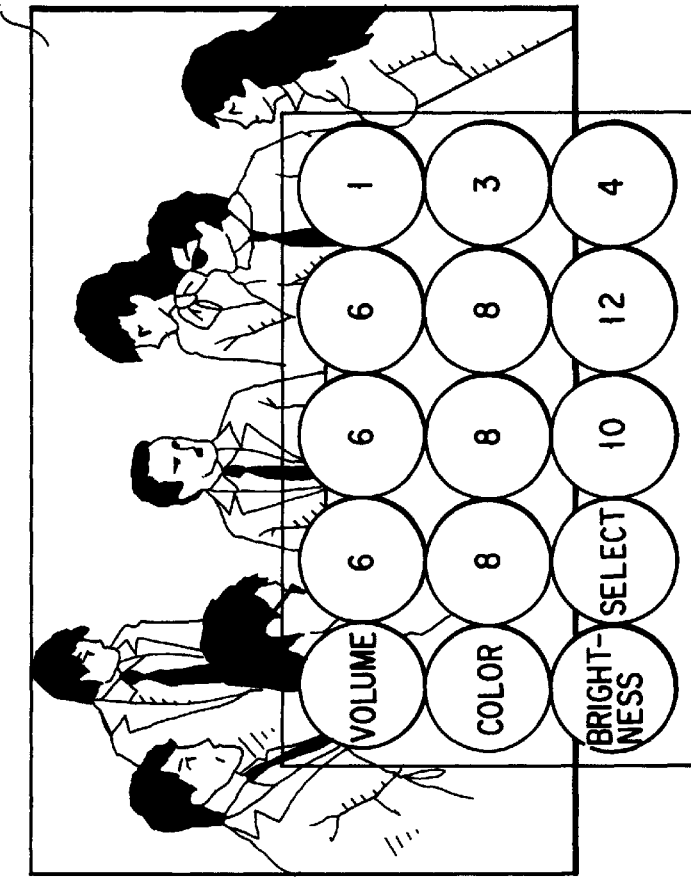
FIG. 8 is a view, useful in explaining a three-dimensional display image created by the three-dimensional image display apparatus, which assumes a state wherein an image component is displayed in front by a three-dimensional image generating circuit incorporated in the apparatus.

Accordingly, the final display image obtained by synthesizing both the first and second image signals consists of an image 801 indicated by the first image signal and displayed behind, and an image 802 indicated by the second image signal and displayed in front, as is shown in FIG. 8.

A stereoscopic image corresponding to the first image signal is displayed behind, while a stereoscopic image corresponding to the second image signal is displayed in front. In the FIG. 8 case, numbers for selecting channels, a character for adjusting the volume, a character for adjusting the color, a character for adjusting the brightness, and a character for selecting channels by up/down selection adjustment are appearing as stereoscopic images corresponding to the second image signals. When the user has extended his hand to the position of the volume-adjusting character, he obtains an up/down key only for adjusting the volume, and a bar display for displaying the adjusted volume. The user can adjust the volume by operating the up/down key. These display data items are stored, for example, in stages in the association memory 304.

Figure 9:
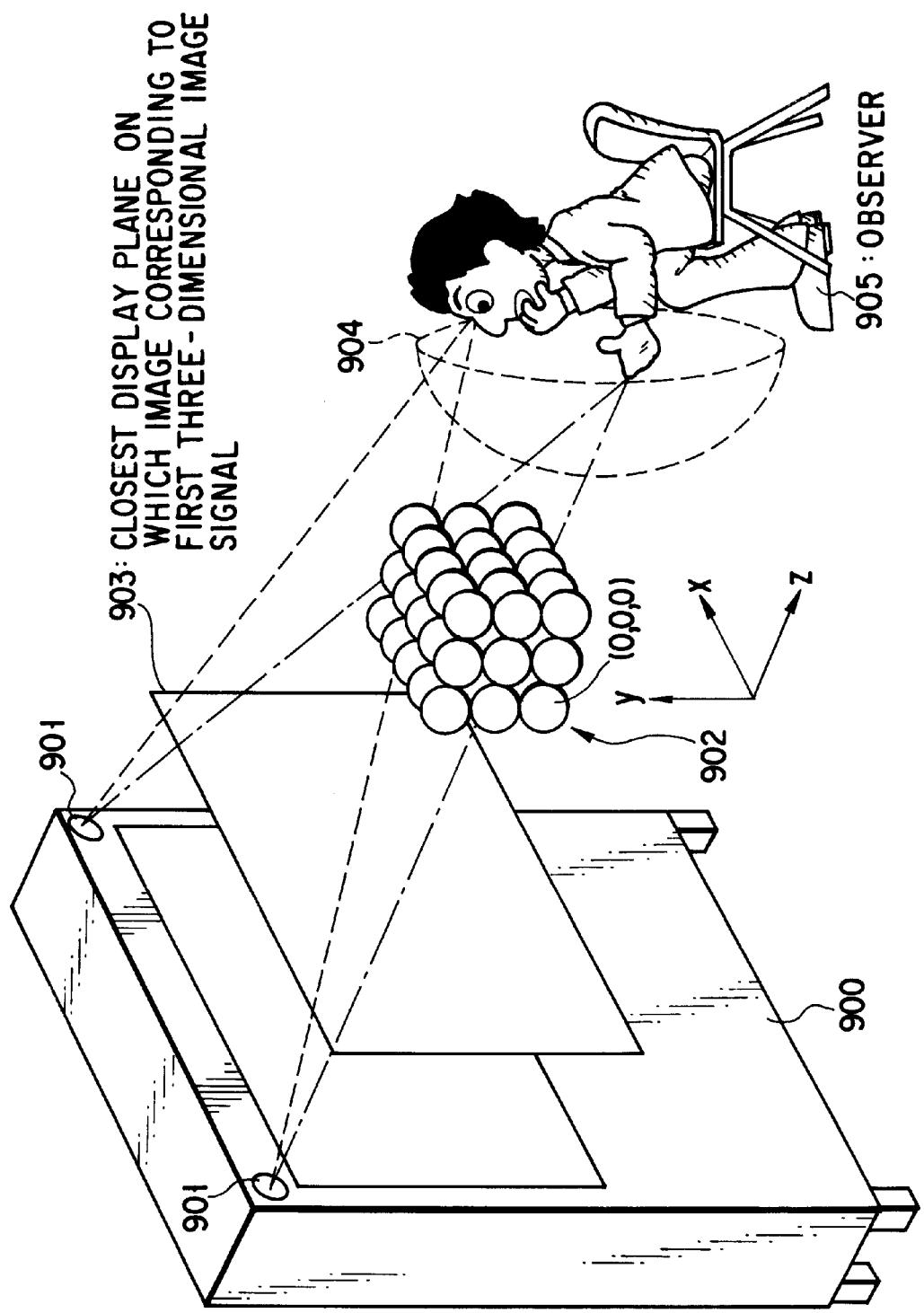
FIG. 9 is a view, useful in explaining a three-dimensional image displayed by the three-dimensional image display apparatus and the operation of the observer.

Referring then to FIG. 9, the operation of the three-dimensional image display apparatus will be described, using an example of its appearance denoted by reference numeral 900, a displayed image and the observer denoted by reference numeral 905. As is indicated by the dashed line, the positions of the left and right eyes of the observer are sensed by image sensors 901. At the same time, as is indicated by the alternate long and short dash line, the position and movement of the hand of the observer are sensed by the sensors. A stereoscopic display image 902 which consists of a plurality of stereoscopic images corresponding to second image signals is displayed in a position close to the observer.

In FIG. 9, x-axis denotes the left/right directions, y-axis the up/down directions, and z-axis the depth direction. For easy explanation, stereoscopic display images which constitute the stereoscopic image 902 are represented by 45 (=5×3×3) spherical bodies. It is a matter of course that the configuration of each image is not limited to this, and a display color can be designated. The coordinates of the lower leftmost spherical body are (0, 0, 0), i.e. the origin. Even if a first three-dimensional image corresponding to a first image signal is displayed in front, its depth is limited, at maximum, to the position indicated by reference numeral 903 (i.e. its z-coordinate is a negative value). The range in which the observer 905 can move his hand with his body kept stable is a substantially semi-spherical space 904 as indicated by the dashed line. To realize the operation function, the coordinates of the hand's position are related to the coordinates of the spherical bodies to be operated as the stereoscopic display images 902 corresponding to the second image signals.

Figure 10:
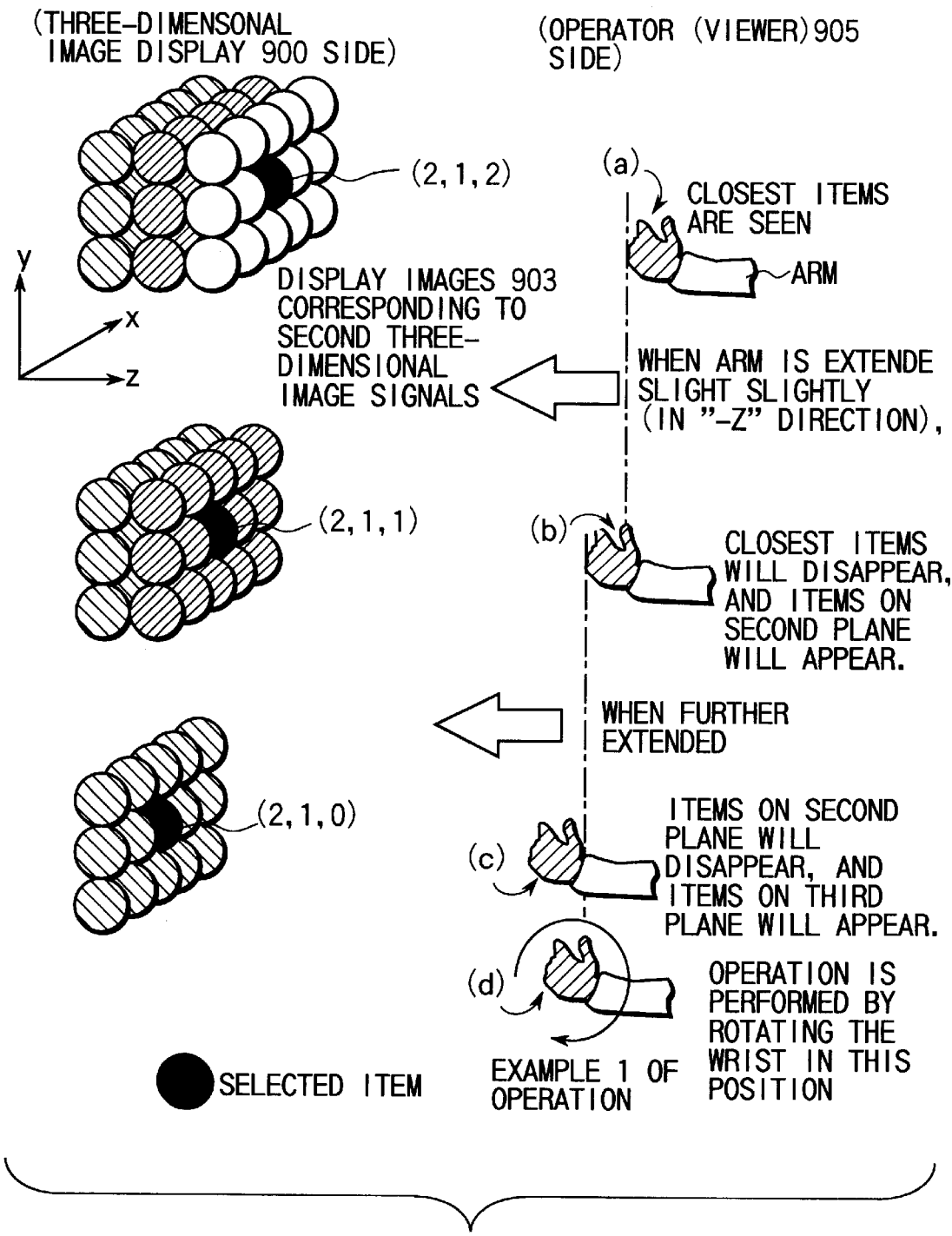
FIG. 10 is a view, useful in explaining an operation of the three-dimensional image display apparatus of the invention.

FIG. 10 shows a sequence of operation for operating, with lapse of time, a to-be-operated target indicated by coordinates (2, 1, 0).

(a) of FIG. 10 illustrates a state in which a to-be-operated target of z =2 is displayed closest to the observer. When the observer has extended his hand in a "−z" direction, the color or shape of a spherical body with coordinates (2, 1, 2) changes to indicate that the position has been shifted to one in which the target with the coordinates (2, 1, 2) can be operated.

When the hand has been further extended in the "−z" direction, the display of the target of z=2 disappears to indicate that the position has been shifted from the one in which the target of z=2 can be selected, to one in which a target of z=1 can be selected, as is illustrated in (b) of FIG. 10. In this state, the observer 905 can see the target of z=1 in a closest position. At this time, the color or shape of a spherical body with coordinates (2, 1, 1) changes to indicate that the position has been shifted to one in which the target with the coordinates (2, 1, 1) can be operated.

When the hand has been yet further extended in the "−z" direction, the display of the target of z=1 disappears to indicate that the position has been shifted to one in which not the target of z=2 or 1 but a target of z=0 can be selected, as is illustrated in (c) of FIG. 10. In this state, the observer 905 can see the target of z=0 in a closest position. At this time, the color or shape of a spherical body with coordinates (2, 1, 0) changes to indicate that the position has been shifted to one in which the target with the coordinates (2, 1, 0) can be operated.

Then, the observer rotates his wrist with his arm fixed, as shown in (d) of FIG. 10, thereby operating the target with the coordinates (2, 1, 0).

Figure 11:
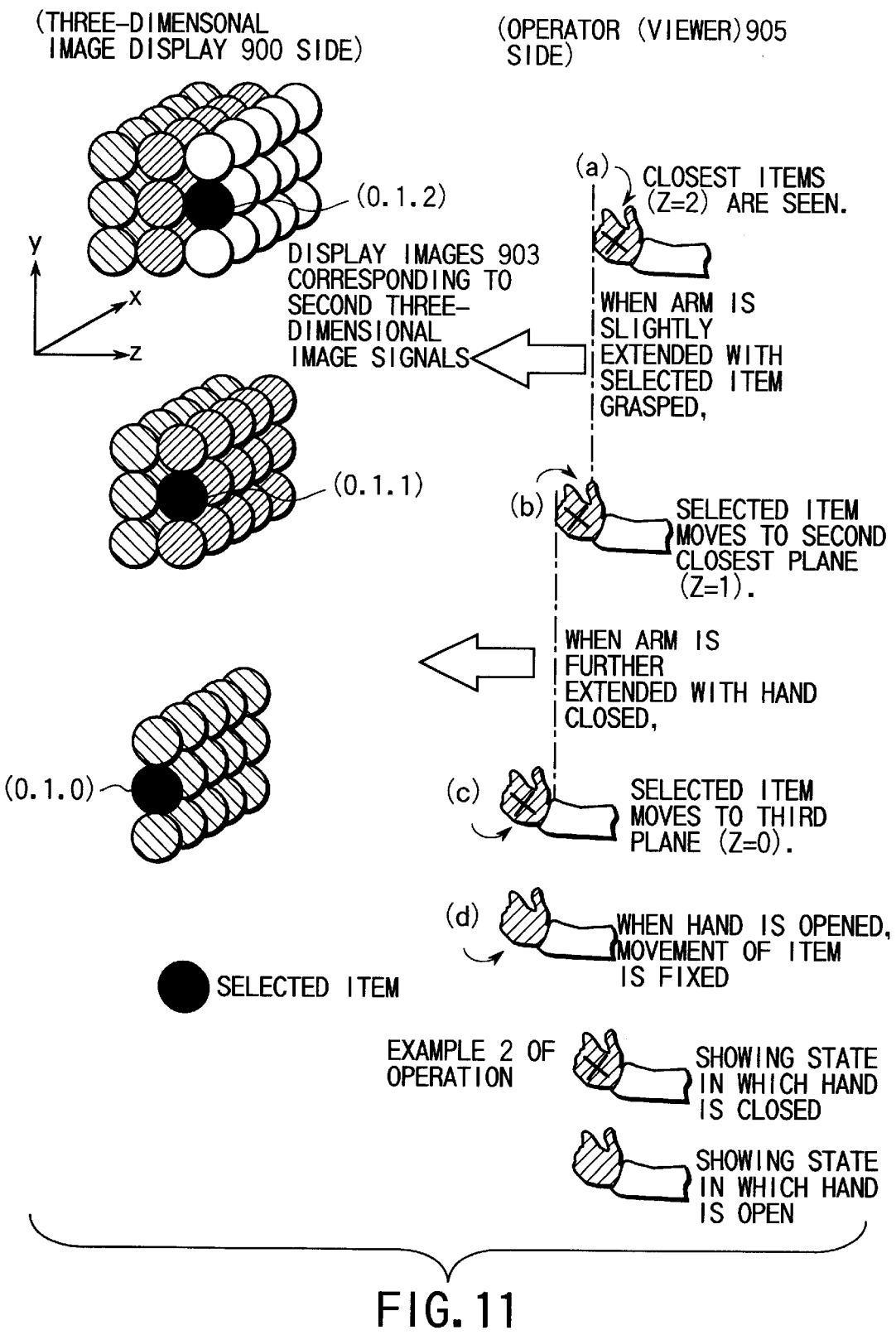
FIG. 11 is a view, useful in explaining another operation of the three-dimensional image display apparatus of the invention.

FIG. 11 shows another example of operation. Specifically, FIG. 11 illustrates a case where a to-be-operated item, i.e. a color adjusting item, with coordinates (0, 1, 2) is shifted to coordinates (0, 1, 0). Before the shifting, the stereoscopic display images 902 corresponding to second image signals are displayed as shown in FIG. 9. To-be-operated items displayed closest to the observer can be operated most easily in a simplest procedure. At this time, the association information held in the association memory 304 includes memory addresses and spatial coordinates of the display images 902 (FIG. 9) corresponding to the second image signals and related to the memory addresses, as is shown in pre-operation table A of FIG. 12.

Although table A shows the spatial coordinates of the stereoscopic display images 902 corresponding to the second image signals, those coordinates may be replaced with corresponding spatial coordinates of the space denoted by reference numeral 904 (FIG. 9).

(a) of FIG. 11 illustrates a state in which a to-be-operated target of z=2 is displayed closest to the observer. When the observer has extended his hand in a "−x" direction, the color or shape of a spherical body with coordinates (0, 1, 2) changes to indicate that the position has been shifted to one in which the target with the coordinates (0, 1, 2) can be operated. This shifting indicates that the spatial coordinates of the present to-be-operated item can be changed by closing the open hand of the observer.

When the hand has been extended in the "−z" direction with the hand closed, the display of the target of z=2 disappears to indicate that the position has been shifted from the one in which the target of z=2 can be selected, to one in which a target of z=1 can be selected, as is illustrated in (b) of FIG. 11. In this state, the observer 905 can see the target of z=1 in a closest position. At this time, the color or shape of a spherical body with coordinates (0, 1, 1) changes to indicate that the position has been shifted to one in which the target with the coordinates (0, 1, 1) can be operated.

When the hand has been yet further extended, the display of the target of z=1 disappears to indicate that the position has been shifted to one in which not the target of z=2 or 1 but a target of z=0 can be selected, as is illustrated in (c) of FIG. 11. In this state, the observer 905 can see the target of z=0 in a closest position. At this time, the color or shape of a spherical body with coordinates (0, 1, 0) changes to indicate that the position has been shifted to one in which the target with the coordinates (0, 1, 0) can be operated.

Then, the observer opens his hand with his arm kept in the position assumed in (c), as shown in (d) of FIG. 11, thereby shifting the to-be-operated item, "color adjusting item", situated in the position with the coordinates (0, 1, 2), to the coordinates (0, 1, 0). The association varying circuit 303 grasps the above-described series of operations. Then, the circuit 303 accesses address 9 of the memory 304 at which the coordinates (0, 1, 2) is stored, thereby reading a value "color adjustment" therefrom, rewriting the area with address 9 as an unused area, and writing the value "color adjustment" into an area with address 39 which stores the coordinate (0, 1, 0). Thus, the association information stored in the association memory 304 has come to be as shown in table B of FIG. 12. In accordance with the values stored in the association memory 304 and the output of the operation-input detecting circuit 301, the three-dimensional image generating circuit 302 generates a three-dimensional image.

Figure 13:
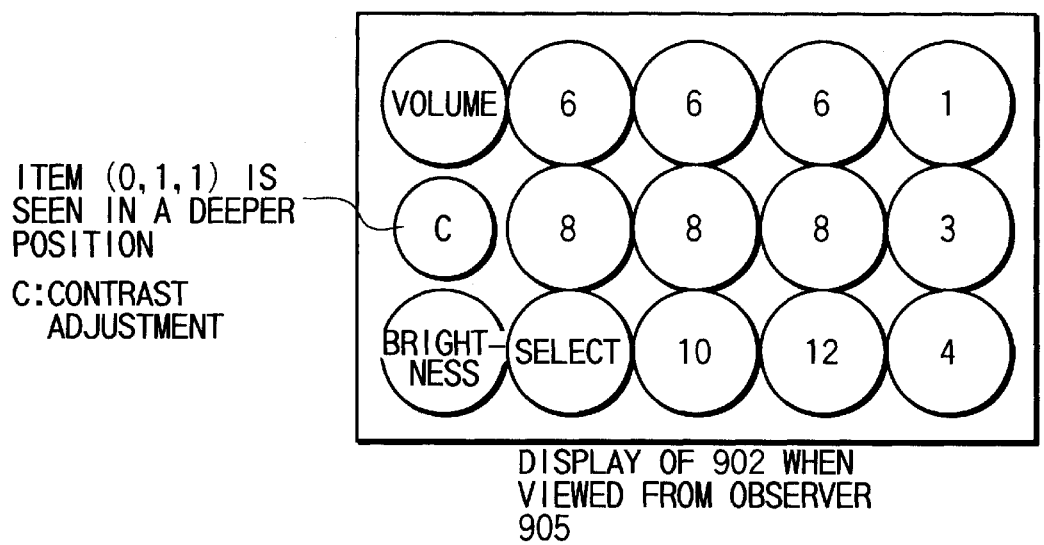
FIG. 13 is a view, showing a display example obtained after the three-dimensional image display apparatus of the invention is operated in a manner different from the above.

As is shown in FIG. 13, the coordinates (0, 1, 2) has come to be an unused point, and hence an inner to-be-operated item "contrast adjustment item" with coordinates (0, 1, 1) has come to appear.

Since the association can be varied freely as above, the often-used items can be arranged closer to the observer, and items of low-frequency use remoter from him, thereby facilitating the operation. Although images corresponding to the to-be-operated items are arranged in the vicinity of the center of the display space in the above embodiments, they may be arranged in peripheral areas of the display space so that they will not interrupt images corresponding to first image signals. Further, since the operation-input detecting circuit 301 senses both the positions of the left and right eyes, the cost of the entire apparatus can be reduced without degrading its function.

In addition, if the observer wishes to display, within the hand's operating space 904, an operation item to be displayed closest to the observer, display control so as to partially display the items of the display image 902 can be performed. Since in this case, operation can be performed without displaying all items of the display image 902, an image corresponding to the first image signal can be prevented from being hidden by the display image 902.

Furthermore, the invention comprises observer position detecting means for detecting the position of the observer who observes the display apparatus, observer position calculating means for calculating the observer position from the output of the observer position detecting means, and observer position adjusting means for adjusting the observer position in accordance with the calculated observer position so that the observer can see an excellent three-dimensional image irrespective of his position. The observer position detecting means is also used as operation-input detecting means. The observer position detecting means or operation-input detecting means can consist of various kinds of means. For example, it can be formed of an image sensor to use a shadow region judging signal or a movement judging signal.

The invention is not limited to the above-described embodiment, but may be modified in various manners. If, for example, another parallax control circuit is employed for multiple channels, images of multiple channels can be displayed in front and behind, which is used for, for example, channel search. In this case, the images of the channels may not necessarily be stereoscopic ones. Also, it may be modified such that stereoscopic display is not performed over the entire screen but only at its corners.

Figure 14:
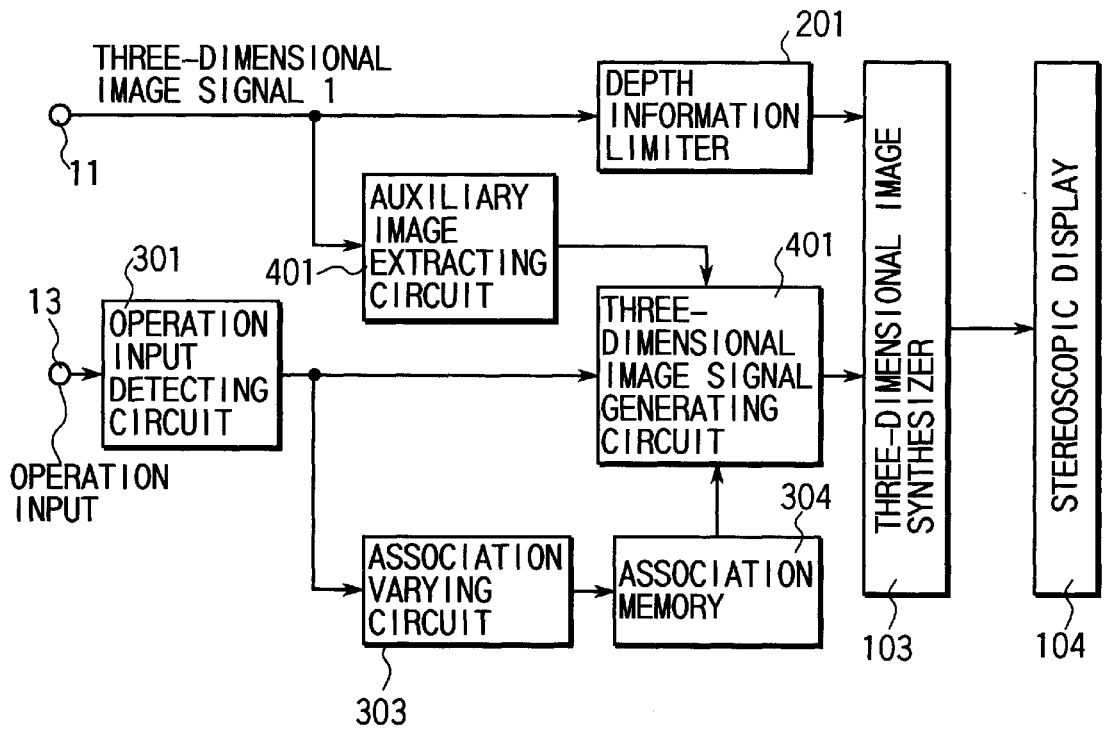
FIG. 14 is a view, showing a fourth embodiment of the invention.

FIG. 14 shows a third embodiment of the invention. This embodiment differs from the FIG. 7 one in that an auxiliary image extracting circuit 401 is provided between the input terminal 11 and the three-dimensional image generating circuit 402.

A three-dimensional image signal 1 is input through the input terminal 11. This signal 1 consists of a three-dimensional image signal A which constitutes a main screen image, and an auxiliary-used image signal B. Further, the three-dimensional image signal 1 may consist of only the three-dimensional image signal A constituting the main screen image and no auxiliary image signal B.

The input three-dimensional image signal 1 is supplied to the depth information limiter 21 and the auxiliary image extracting circuit 401. The depth information limiter 21 extracts the auxiliary-used image signal B from the input signal 1 and supplies it to the three-dimensional image generating circuit 402. This circuit 402 generates a three-dimensional image signal different from the three-dimensional image signal A, on the basis of a stereoscopic shape corresponding to the input and extracted image signal B and display control corresponding to the operation, and supplies it to the three-dimensional image synthesizer 103.

If, on the other hand, the three-dimensional image signal 1 does not include the auxiliary-used image signal B, the circuit 402 performs the same operation as the three-dimensional image generating circuit 302 employed in the other embodiments.

As described above, the third embodiment can provide the same advantage as the other embodiments, and further can realize excellent display when the three-dimensional image signal includes an auxiliary image signal, by skillfully operating, in a depth direction, the three-dimensional image signal corresponding to the main screen image and an image corresponding to the auxiliary image signal.

As described above, while observing a three-dimensional image, the user can operate the three-dimensional image display apparatus (e.g. can switch channels) without taking his eyes off the screen or struggling to find a remote controller, or once taking off shutter glasses.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image display apparatus for displaying an image corresponding to an image signal in a three-dimensional display space, comprising:

operation-input detecting means for detecting function adjusting operation information used to operate the three dimensional display apparatus;

three-dimensional image signal generating means for receiving the function adjusting operation information, and generating a three-dimensional image signal indicative of an operation state;

space/to-be-operated-item associating and storing means for setting a position in which the function adjusting operation information is input, in that portion of the three-dimensional display space which is situated near an operator, associating the position with to-be-operated items, and storing the association information;

association varying means for varying the association information stored in the space/to-be-operated-item associating and storing means on the basis of the function adjusting operation information from the operation-input detecting means; and display means for three-dimensionally displaying an image corresponding to the three-dimensional image signal including a related image of the function adjusting operation information.

2. A three-dimensional image display apparatus according to claim 1, further comprising means for determining whether or not an image signal component contained in the three-dimensional image signal generated by the three-dimensional image signal generating means should be three-dimensionally displayed.

3. A three-dimensional image display apparatus according to claim 1, wherein the operation-input detecting means includes operator position detecting means for detecting the position of an operator who operates the three-dimensional image display apparatus;

and further comprising:

operator position calculating means for calculating the position of the operator from the output of the operator position detecting means; and operator position adjusting means for performing adjustment on the basis of the calculated operator's position where the operator is allowed to observe a three-dimensional image displayed in space.

* * * * *